United States Patent
Launay

(10) Patent No.: US 12,292,262 B2
(45) Date of Patent: May 6, 2025

(54) SYSTEM AND METHOD FOR SECURING A RISKY GEOGRAPHICAL AREA

(71) Applicant: Airbus Defence and Space SAS, Toulouse (FR)

(72) Inventor: Nicolas Launay, Elancourt (FR)

(73) Assignee: Airbus Defence and Space, S.A.S., Toulouse (FR)

( * ) Notice: Subject to any disclaimer, the term of this patent is extended or adjusted under 35 U.S.C. 154(b) by 218 days.

(21) Appl. No.: 17/757,604

(22) PCT Filed: Dec. 15, 2020

(86) PCT No.: PCT/EP2020/086286
§ 371 (c)(1),
(2) Date: Jun. 17, 2022

(87) PCT Pub. No.: WO2021/122646
PCT Pub. Date: Jun. 24, 2021

(65) Prior Publication Data
US 2023/0015339 A1    Jan. 19, 2023

(30) Foreign Application Priority Data
Dec. 20, 2019 (FR) ...................... 1915212

(51) Int. Cl.
*B64C 39/02* (2023.01)
*F41G 7/34* (2006.01)
(Continued)

(52) U.S. Cl.
CPC ............ *F41G 9/002* (2013.01); *B64C 39/024* (2013.01); *F41G 7/34* (2013.01); *G05D 1/104* (2013.01);
(Continued)

(58) Field of Classification Search
None
See application file for complete search history.

(56) References Cited

U.S. PATENT DOCUMENTS 7,693,653 B2 * 4/2010 Hussain ............... G01C 21/20
340/995.14
2004/0030448 A1  2/2004 Solomon
(Continued)

FOREIGN PATENT DOCUMENTS

WO    2018048913 A1    3/2018

OTHER PUBLICATIONS

International Search Report from corresponding PCT application No. PCT/EP2020/086286, mailed on Jan. 21, 2021.

*Primary Examiner* — Jelani A Smith
*Assistant Examiner* — Davin Seol
(74) *Attorney, Agent, or Firm* — Greer, Burns & Crain, Ltd.

(57) ABSTRACT

A method for securing a geographical area encompassing a route. A map of the area is obtained. A weapon is associated with a firing modeling consisting of a probability model of hitting its target when shooting, as a function of the firing distance. Positions of potential shelters of threats on the map are determined by using a trained artificial intelligence device. The modeling is applied for each weapon and potential shelter while relating the shots to the route and summing all the probabilities of hitting its target on each portion of the route. The potential shelters most likely to constitute attack threats along the route are determined. A path is defined in order to address these potential shelters most likely to constitute attack threats.

14 Claims, 4 Drawing Sheets

(51) Int. Cl.
*F41G 9/00* (2006.01)
*G05D 1/00* (2006.01)
*B64U 101/15* (2023.01)

(52) U.S. Cl.
CPC ...... *B64U 2101/15* (2023.01); *B64U 2201/20* (2023.01)

(56) References Cited

U.S. PATENT DOCUMENTS

| | | |
|---|---|---|
| 2006/0085106 A1 | 4/2006 | Gaudino et al. |
| 2006/0266203 A1* | 11/2006 | Herman ................. F41G 9/002 89/1.11 |
| 2014/0249744 A1* | 9/2014 | Andersson ......... G01C 21/3461 701/410 |
| 2019/0353492 A1* | 11/2019 | Mathew ............. G01C 21/3697 |

* cited by examiner

SYSTEM AND METHOD FOR SECURING A RISKY GEOGRAPHICAL AREA

RELATED APPLICATIONS

This application is a National Stage of International Application No. PCT/EP2020/086286, filed on Dec. 15, 2020, which claims priority to French Patent Application No. 1915212, filed on Dec. 20, 2019, the entireties of all of which are incorporated herein by reference.

TECHNICAL FIELD

The present invention relates to a method and a system for securing a geographical area that constitutes a risk for the safety of equipment and persons.

STATE OF THE PRIOR ART

When a mobile unit, for example a civilian convoy or armed troops, is moving in a geographical area that constitutes a risk for the safety of equipment and persons, the mobile unit may be ambushed. Application WO2018048913 teaches a method for dynamically routing a plurality of available resources, wherein patrol paths are initially defined and assigned to the various resources, then redefined and reassigned in the event of detecting a geographically located threat.

The present invention aims to further improve the safety of equipment and persons. The present invention aims in particular to improve the intervention plan of one or more addressing units. The present invention also aims to allow these addressing units to effectively cover the geographical area considered, whether in terms of aerial or ground reconnaissance, or in terms of armed intervention.

SUMMARY OF THE INVENTION

A method for securing a geographical area encompassing a route is proposed, characterized in that it comprises the following steps:
obtaining a map of the geographical area encompassing said route;
selecting at least one weapon, each weapon being associated with at least one firing modeling consisting of a probability model of hitting its target when shooting, as a function of the firing distance;
determining positions of potential shelters of threats on the map by using a trained artificial intelligence device;
applying the modeling for each selected weapon and for each potential threat shelter while relating the shots to the route and storing and summing all the probabilities of hitting its target on each portion of the route;
identifying the potential shelters most likely to constitute attack threats along the route by determining the portions of the route that have a probability of hitting the target higher than a determined threshold and by selecting the potential shelters contributing most thereto; and
defining and providing at least one path intended for at least one addressing unit, said path being determined in order to neutralize said potential shelters most likely to constitute attack threats.

Thus, in order to forestall ambush threats, the geographical area in question is inspected, and thus secured, optimally as a function of the route by using addressing units. An addressing unit is a physical entity capable of interacting with a command center and of surveilling or neutralizing a given objective. For example, an unmanned drone, a ground drone or a swarm of drones may constitute an addressing unit.

According to one feature of the invention, the method is followed by execution of the path or paths by the addressing unit or units.

According to another feature, the map contains elevation information. Thus, the search for potential shelters is more refined.

According to another feature, the map is in the form of 3D terrain modeling.

According to one feature, the map is obtained from satellite or aerial images of said geographical area encompassing said route, these images being combined and/or aggregated. Recent aerial surveillance may advantageously be used in order to take the latest developments of the terrain into account.

According to another feature, said threshold for the probability of hitting the target for each portion of the route is re-adjusted to a minimum while keeping each total distance of each path, intended for each addressing unit, below an autonomy capability of this addressing unit. Thus, the route is secured maximally as a function of the available addressing capabilities.

According to another feature, a plurality of paths are calculated for a plurality of addressing units, said threshold for the probability of hitting the target for each portion of the route being readjusted so that the sum of the total distances travelled along the paths is less than the sum of the autonomies of the addressing units. Here again, the use of the addressing units is optimal.

According to another feature, before applying the modeling for each weapon and each potential threat shelter, in a preceding step, the compatibility of the presence of each weapon as a function of the topology of the potential threat shelter is verified.

According to another feature, the modeling of each weapon takes climatic data into account. Thus, probabilities of hitting the target that are degraded as a function of the climatic conditions may easily be taken into account.

According to another feature, the selection of said weapon is carried out from a database which, for each weapon, stores said modeling as well as a probability of the presence of the weapon as a function of a stored geographical location that may correspond to the geographical area encompassing said route, the weapons being selectable automatically as a function of their presence probability.

According to another feature, before applying the modeling for each weapon and each potential threat shelter, the positions of potential threat shelters are added to the map by using reports of operators on the terrain. Thus, the threat evaluation method maintains operational flexibility by allowing the addition of terrain information.

A computer program product, comprising instructions which lead to the method mentioned above being carried out by a processor when said instructions are executed by the processor, is also proposed. An information storage medium on which such a computer program product is stored is also proposed.

A server in communication with at least one command center for securing a geographical area encompassing a route is also proposed, characterized in that it comprises electronic circuitry configured in order to:
obtain a map of the geographical area encompassing said route;
obtain or select at least one weapon, each weapon being associated with a firing modeling consisting of a probability model of hitting its target when shooting, as a function of the firing distance;

determine positions of potential shelters of threats on the map by using a trained artificial intelligence device;

apply the modeling for each selected weapon and for each potential threat shelter while relating the shots to the route and storing and summing all the probabilities of hitting its target on each portion of the route;

identify the potential shelters most likely to constitute attack threats along the route by determining the portions of the route that have a probability of hitting the target higher than a determined threshold and by selecting the potential shelters contributing most thereto; and define and provide at least one path intended for at least one addressing unit, said path being determined in order to neutralize said potential shelters most likely to constitute attack threats.

BRIEF DESCRIPTION OF THE DRAWINGS

The abovementioned characteristics of the invention, as well as others, will become clearer on reading the following description of at least one exemplary embodiment, said description being given in conjunction with the appended drawings, in which.

DETAILED DESCRIPTION OF EMBODIMENTS

Figure 1:
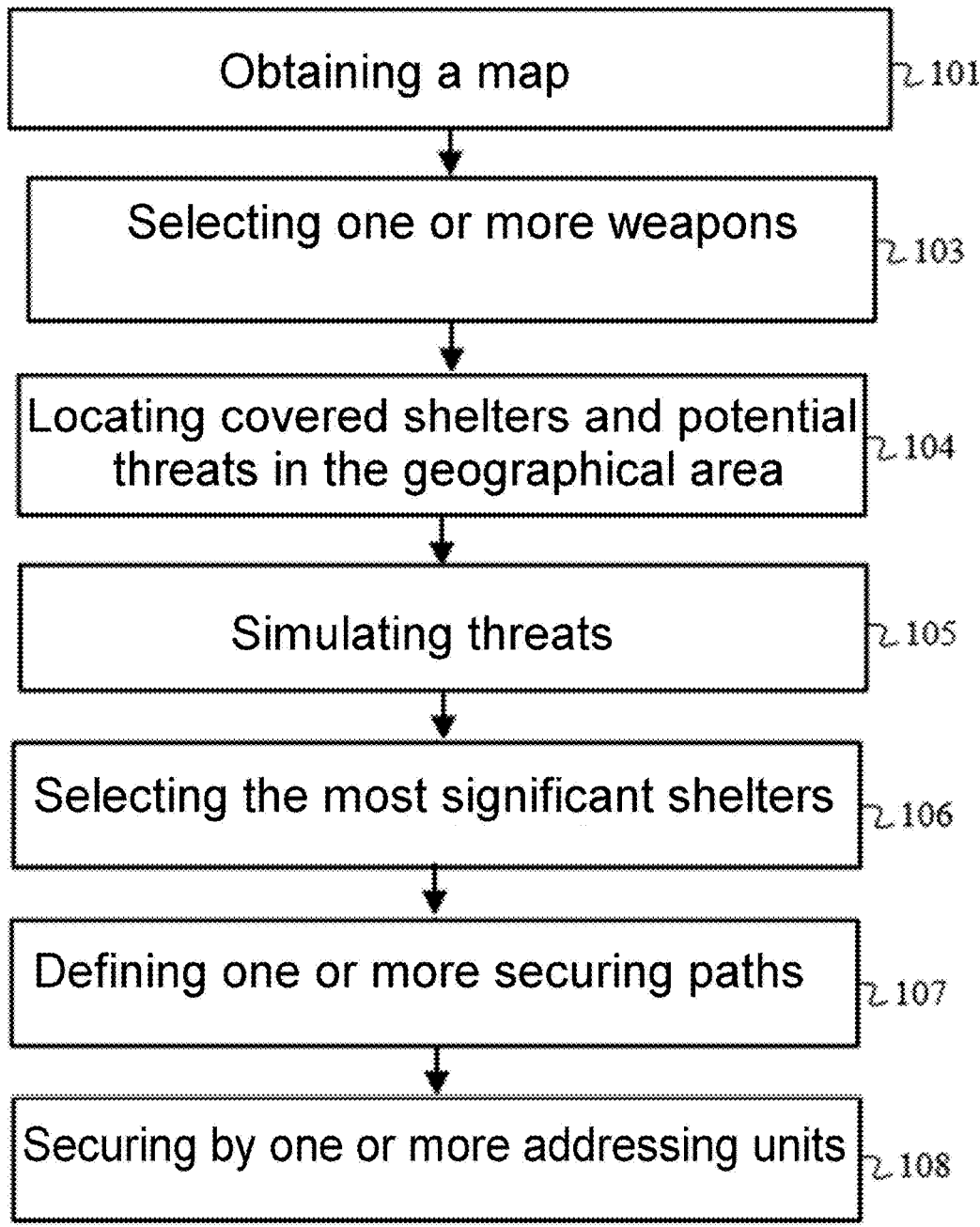
FIG. 1 schematically illustrates a flowchart of an algorithm for defining an intervention plan of one or more addressing units.

FIG. 1 schematically illustrates a flowchart of an algorithm for defining an intervention plan of one or more addressing units. The algorithm is implemented by a computerized processing unit. It is assumed for illustration that the algorithm of FIG. 1 is implemented by a server for defining the intervention plan 310, referred to below as a PDS server (Plan Definition Server).

In a step 101, the PDS server 310 obtains a map including a route 350 to be taken into consideration. An example of a map 340 including a route 350 is given in FIG. 4. A convoy 22 is indicated by a star. Here, the route corresponds to a route suitable for motor vehicles, although any type of route 350 could be envisioned.

The route descriptive is provided, for example, by a user interface or a description file. A command center CC 320 may also provide the PDS server 310 with the descriptive of the route 350. The route descriptive corresponds to a descriptive of a set of geographical positions which are successively linked.

The coordinates of the route are, for example, indicated by waypoints, these points being linked to one another by straight lines in order to form the route in its entirety. The route may be laid over a 2D map or projected onto a 3D map.

Reliefs are shown on the map of the geographical area, here in 2D. A map which is in the form of a 3D digital terrain model could also be envisioned. The map may also be in the form of a 2D map that includes elevation information in the form of metadata.

The PDS server 310 defines, for example, a geographical area to be considered extending to a determined distance on either side of the route. The geographical area is referenced by using geolocation coordinates. On the basis of these geolocation coordinates, the PDS server 310 can recover terrain images of the geographical area concerned from one or more databases, such as satellite images or images taken by high-altitude stations of the HAPS type (High-Altitude Platform Stations). These images are for example aggregated in order to cover the entire geographical area concerned.

These images may also be combined in order to form elevation models of the geographical area. The elevation models are, for example, aggregated in order to form an elevation model of the entire geographical area.

The server may also directly obtain an elevation model of the entire geographical area via a dedicated server managing a database in which the elevation models are calculated in advance and stored with a view to their use. The modeling of the terrain is then obtained from a 3D server, which the PDS server 310 provides with a descriptive of the geographical area concerned. For example, the modeling of the terrain with elevation may be obtained from the WorldEM or DTED (Detailed Terrain Elevation Data) database, or from the OneAtlas (registered trademark) library. The PDS server 310 may also provide the 3D server with the recovered terrain images and, if available, the recovered elevation model, so that the 3D server can make use thereof in order to establish new modeling of the terrain of the geographical area considered.

The elevation model advantageously makes it possible to carry out spatial calculations which are more realistic and more accurate than a 2D map. The 2D or 3D map is advantageously textured. The PDS server 310 may also use dating information of the images or 3D models in order to select the most recent data.

Figure 5:
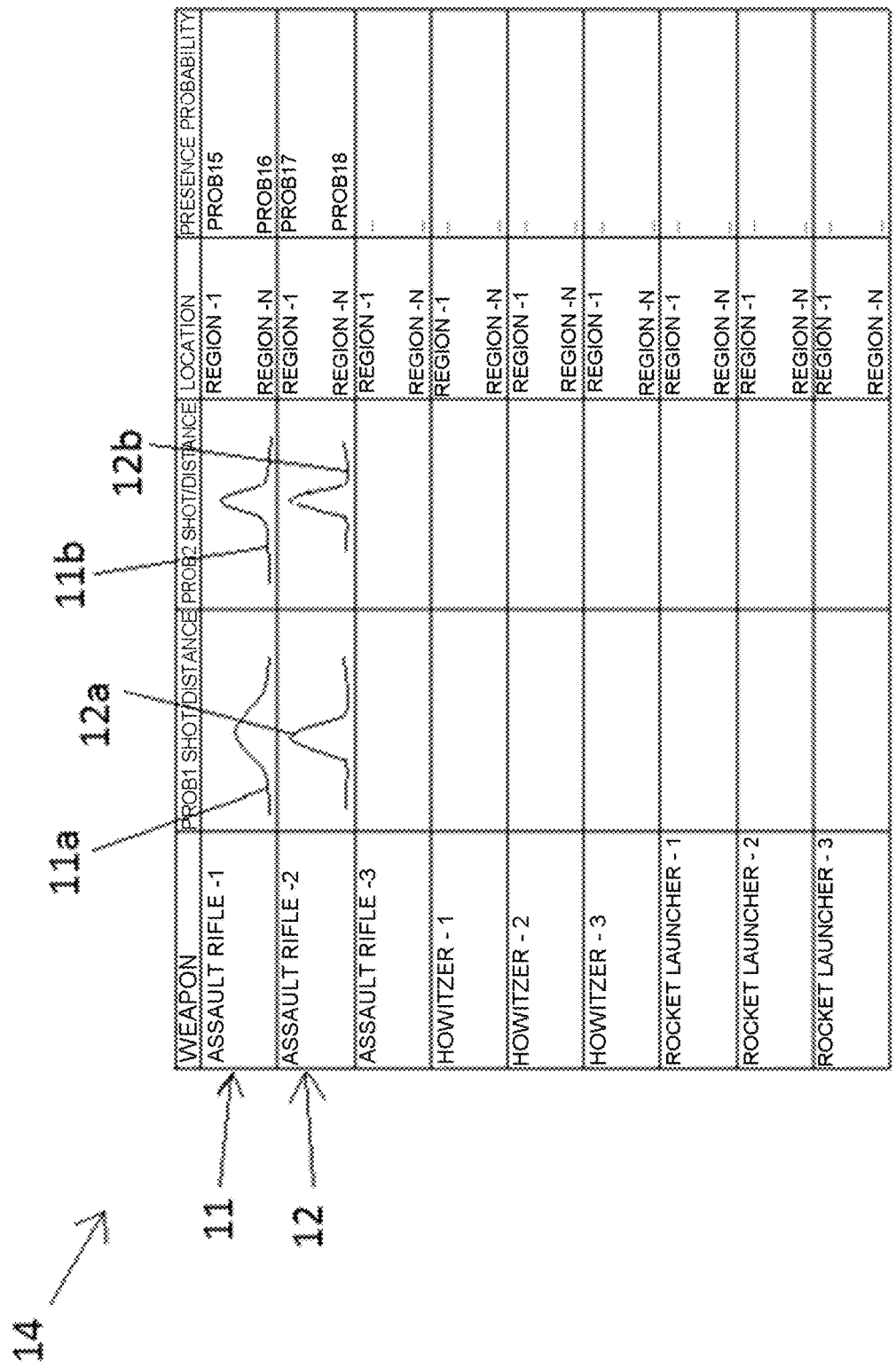
FIG. 5 illustrates a database including a plurality of weapons.

In a step 103, the PDS server 310 obtains a selection of one or more weapons. The weapons come from a database 14, as represented in FIG. 5. The database 14 comprises for example a first weapon 11 corresponding to a first type of assault rifle, with which a probability 11a of hitting its target as a function of the distance is associated. Specifically, the weapons are more or less effective according to their accuracy. For example, different effective distances are associated with different weapons. Here, all the firing distances and each risk which results therefrom are advantageously taken into account. A second weapon 12 is associated with another probability 12a of hitting its target as a function of the distance.

The database comprises, for example, at least one second probability 11b or 12b which is associated with each weapon and corresponds to the probability of hitting its target as a function of the distance but under different conditions. This is, for example, the probability degraded by rainy, windy or snowy weather. Thus, it is possible to take into account climatic conditions involving a degraded effectiveness of a weapon.

The database 14 comprises, for example, geographical data and a probability associated with the presence of the weapon. The geographical data comprise for example regions, referenced REGION-1 to REGION-N, with which presence probabilities referenced PROB15, PROB16, PROB17 and PROB18 are associated. Thus, the selection of a weapon may be guided via a user interface, or the selection may be implemented automatically as a function of a geographical location of the route.

The weapons descriptive may, as a variant, be provided via a user interface or by a description file.

The modeling of a weapon includes the spread of the shots by a soldier with average competence, as a function of the distance.

In a step 104, the PDS server 310 locates shelters for weapons, that is to say covered positions, on the map. The locating of the shelters is carried out by an artificial intelligence module for the detection and classification of images or 3D models, developed by automatic learning (machine learning). This shelter detection module is, for example, in the form of a convolutional neural network (CNN). The shelter detection module takes the 2D, or respectively 3D, map as input and provides the 2D, or respectively 3D, locations of the shelters on the map as output. These locations are added to the map, which is thereby enhanced.

The shelter detection module may form part of the PDS server 310. This module for detecting and classifying images or 3D models by automatic learning is, for example, trained on the basis of images or 3D models to which experts have added positioning labels of potential shelters. These images or models are thus supplemented with labels. The learning may be carried out by algorithms of the PCA (Principal Component Analysis) or ReLU (Rectified Linear Units) type.

One optional step may comprise the manual addition of positions of potential shelters as a function of information collected from the terrain, such as knowledge of high-risk ("high-venture") points or results of previous missions. The method therefore retains flexibility to be able to take certain realities of the terrain into account.

One optional step may comprise verification of the topology of each shelter with a view to each selected weapon. The topology of each shelter may be determined by the shelter detection module, the training data marked by the experts comprising characteristics relating to the nature of the shelters, for example artificial reliefs such as walls or buildings, or natural reliefs such as trees, ridges or hollows. Thus, in the event of a shelter incompatible with a certain type of weapon, this weapon will not be simulated for this shelter. It is thus possible to take into account the fact that certain shelters are incompatible with certain types of weapons. For example, a shelter which is suitable for mortar use may not be suitable for a rifle when a terrain obstacle obstructs the line of sight between the shelter in question and the route 350. For example, a shelter which is suitable for an assault rifle in a particularly steep place will not be suitable for a howitzer being fired.

In a step 105, the PDS server 310 simulates the threats as a function of the selected weapons and the locations of the potential shelters identified. The modeling of the selected weapons is applied to each potential shelter position while relating the characteristics of the potential shots to the route 350. The PDS server calculates, in particular, the distance between the shelter and one or more portions of the route and the shot probabilities which result therefrom. Shots at the portions of the route for which the shot probability is less than a determined threshold are for example ignored, that is to say they are not counted. The field of action of each weapon as well as the probability of hitting a target as a function of the distance are given by the modeling of the weapon in question. For example, for the weapon referenced "ASSAULT RIFLE-1", it may be assumed that the probability of hitting a target is 90% at 30 meters, 80% at 80 meters and 50% at 200 m. In rainy conditions, for the same weapon, the probability of hitting a target is 70% at 30 meters, 50% at 80 meters and 20% at 200 m. This example is only illustrative, and the modeling of the weapon may comprise much more refined sampling of the distances. The shot probability is for example differentiated for an interval of one meter or for an interval of 10 cm, for distances which may extend up to several hundreds of meters or even several kilometers.

The probabilities of impact on the route 350 are calculated and summed for each portion of the route, for all the shelters and for all the weapons selected. Advantageously, the climatic conditions may be taken into account.

Figure 4:
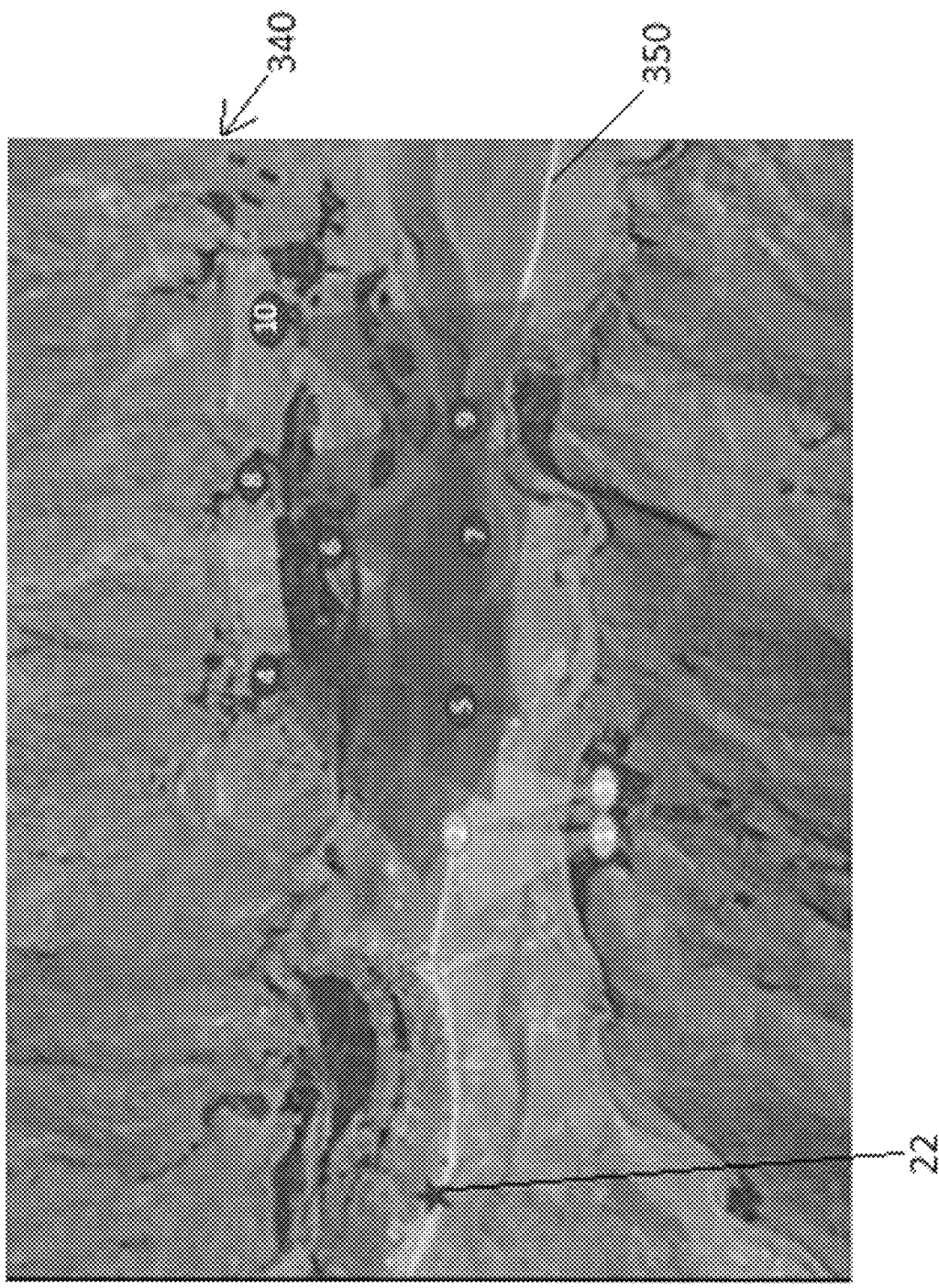
FIG. 4 illustrates a map including a route to be secured.

In a subsequent step 106, the shelters which are most significant in relation to the risk calculated for each portion of the route are selected. As represented in FIG. 4, the points referenced 2, 5, 7 and 9 are above an acceptable risk threshold. This risk threshold may be adjusted. A module for selecting the significant shelters carries out for example a selection, on the basis of these risk calculations above the acceptable threshold, of the shelters contributing to this risk, particularly in order to bring the risk back to an acceptable level.

This module for selecting the significant shelters is, for example, a module for detecting and classifying the data by automatic learning. The module for selecting the significant shelters is, for example, in the form of a probability tree ("random forest"). The module for selecting the significant shelters may also be in the form of a deep neural network. The module for selecting the significant shelters may be trained by logarithmic regression or by regularized linear regression. Other algorithms such as GDR (Gradient Descent Regression) or other classification algorithms may also be envisioned. The module for selecting the significant shelters may be trained with the aid of analyses by experts. The module for selecting the significant shelters may also be trained with the aid of mission report data in order to characterize the distances of particularly dangerous ambushes.

A module for selecting the significant shelters could be envisioned which carries out a selection of the potential shelters most likely to constitute threats on the route 350 by correlating the distances separating the identified potential shelters and effective ranges of the selected weapons.

For example, the shelter selection module may be a module for detecting and classifying data by automatic learning, using a probability tree in order to correlate the distances separating the identified potential shelters and the effective ranges of the selected weapons.

In a 2D model, the calculations relating to the firing distances may be approximated by considering the projections onto the ground.

As represented in FIG. 4, the significant shelters 1, 3, 4, 6, 8 and 10 have been selected.

In a step 107, the PDS server 310 selects the waypoints corresponding to the potential threat shelters 1, 3, 4, 6, 8 and 10 to be neutralized. The STAR (Standard Terminal Arrival Route) procedure may be used in order to define each path.

Figure 3:
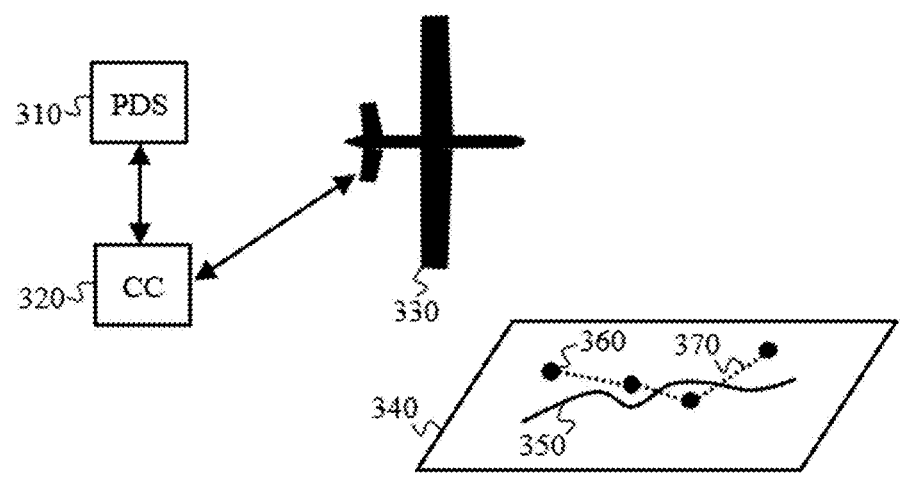
FIG. 3 schematically illustrates a system for defining and setting up the intervention plan.

The PDS server 310 may define an intervention plan comprising one or more paths (or "waypoints"). FIG. 3 shows an example of a path 370 linking the points 360.

The drones, for example aerial drones, each have an autonomy. It is thus important for the path assigned to a drone to have a total distance less than the capability of the drone. An optimized autonomy corresponding to a resource level determined according to a plan for optimizing the available resources may thus be considered, which aims to reserve a margin for maneuver or aims to allow emergency measures or to allow other uses of the addressing units.

The server may establish a plurality of paths traveled successively by the same drone, which replenishes its energy between two paths.

A plurality of paths may thus be produced for a plurality of drones flying simultaneously, each path having a total distance less than the autonomy of the drone to which it is assigned.

The addressing units 330 may, for example, be of the aerial or ground type. The addressing units may be in the form of drones or in the form of piloted vehicles.

An addressing unit may also be in the form of a swarm of drones or in the form of a squad of vehicles.

Preferably, the PDS server 310 defines the plurality of paths while taking into account preconfigured autonomy capability information of each addressing unit for which the intervention plan is intended.

The PDS server 310 may, in particular, adjust the predefined threshold used for selecting the waypoints as a function of an autonomy capability of the addressing unit or units for which the intervention plan is intended. Thus, when the autonomy capability does not make it possible to cover the selected waypoints, the PDS server 310 may increase the predefined threshold. When the autonomy capability makes it possible to include more waypoints in the intervention plan, the PDS server 310 may also reduce the predefined threshold. Step 106 may, for example, be repeated by considering the threshold that has been set. Advantageously, the risk threshold on each portion of the route 350 may be adjusted. By increasing this threshold of tolerable risk on the route, the need for securing and the required drone resource is reduced. By reducing this tolerable risk on the route, the safety is increased. The risk management may thus be optimized as a function of the resources available.

In a step 108, the PDS server 310 provides the intervention plan comprising one or more securing paths intended for one or more addressing units.

The PDS server 310 may also present the intervention plan via a user interface, for example in graphical form by overlaying the intervention plan on the map of the terrain.

The PDS server 310 may, for example, provide the intervention plan to a control center CC 320. The PDS server 310 may also provide the intervention plan directly to one or more addressing units 330, for example a drone or a fleet of drones.

Figure 2:
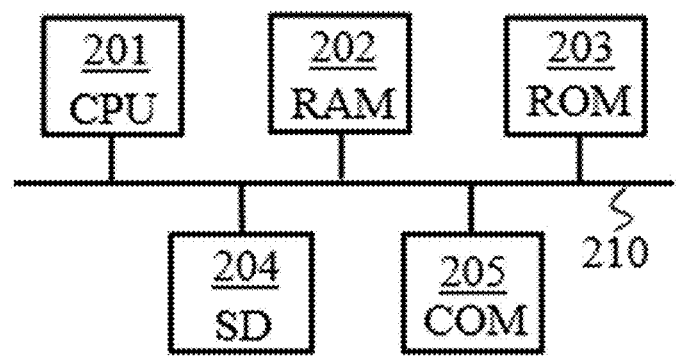
FIG. 2 schematically illustrates an example of the hardware architecture of a system configured in order to implement the algorithm of FIG. 1.

FIG. 2 schematically illustrates an example of the hardware architecture of the PDS server 310. The PDS server 310 then comprises, linked by a communication bus 210: one or more processors or CPUs (Central Processing Units) 201; a random-access memory RAM 202; a read-only memory ROM 203, for example of the EEPROM type (Electrically-Erasable Programmable ROM) or a flash memory; a storage unit 204, such as a hard disk drive HDD, or a storage medium reader such as an SD (Secure Digital) card reader; a communication interface manager COM 205.

The communication interface manager COM 205 allows the PDS server 310 to communicate with a user and/or a physical connection interface, for example in order to receive the descriptive of the route 350 to be considered or in order to provide the intervention plan.

The processor 201 is capable of executing instructions loaded into the random-access memory RAM 202 from the read-only memory ROM 203, from an external memory, from a storage medium (such as a removable memory card of the SD type), or from a communication network. When the PDS server 310 is powered up, the CPU 201 is capable of reading instructions from the random-access memory RAM 202 and executing them. These instructions form a computer program causing the processor 201 to implement all or some of the steps, operations and behaviors described here in connection with the PDS server 310.

All or some of the steps, operations and behaviors described here in connection with the PDS server 310 may thus be implemented in software form by the execution of a set of instructions by a programmable machine, for example a processor of the DSP type (Digital Signal Processor) or a microprocessor, or they may be implemented in hardware form by a machine or a dedicated component, for example an FPGA (Field-Programmable Gate Array) or ASIC (Application-Specific Integrated Circuit). In general, the PDS server 310 comprises electronic circuitry adapted and configured in order to implement the steps, operations and behaviors described here in connection with the PDS server 310 in software and/or hardware form.

FIG. 3 schematically illustrates a system for defining and setting up the intervention plan provided by executing the algorithm of FIG. 1. FIG. 3 shows the PDS server 310 connected to the command center CC 320. The command center CC 320 is, for example, configured in order to provide the PDS server 310 with the descriptive of the route 350 to be considered. The PDS server 310 is, for example, configured in order to define the intervention plan with a view to the route 350 and in order to provide the intervention plan to the command center CC 320. The server could also be integrated into a command center.

The command center CC 320 is, for example, connected to one or more addressing units 330 and is configured in order to send the addressing units 330 their path. The intervention plan defines at least one path 370 to be followed in order to carry out surveillance of the waypoints 360 selected by the PDS server 310. Thus, an operation of securing the route 350 may be performed by the addressing unit or units 330 by following the intervention plan defined by the PDS server 310.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for securing a geographical area encompassing a route, the method comprising the following steps:
   obtaining a map of the geographical area encompassing said route;
   selecting at least one weapon, each weapon being associated with at least one firing modeling comprising a probability model of hitting a target when shooting, as a function of a firing distance;
   determining positions of potential shelters of threats on the map by using a trained artificial intelligence device;
   executing the at least one firing modeling for each selected weapon and each potential threat shelter while relating shots to the route, and storing and summing all probabilities of each selected weapon hitting the target on each portion of the route;

identifying potential shelters most likely to constitute attack threats along the route by determining the portions of the route that have a probability of hitting the target higher than a determined threshold and by selecting the potential shelters contributing most thereto;

defining and providing at least one path intended for at least one addressing unit, said at least one path being determined in order to neutralize said potential shelters most likely to constitute attack threats; and securing the geographical area encompassing the route by instructing the at least one addressing unit to follow the at least one path, wherein the at least one addressing unit follows the at least one path.

2. The method as claimed in claim 1, further comprising: execution of the at least one path by the at least one addressing unit.

3. The method as claimed in claim 1, wherein the map contains elevation information.

4. The method as claimed in claim 1, wherein the map comprises 3D terrain modeling.

5. The method as claimed in claim 1, wherein the map is obtained from satellite or aerial images of said geographical area encompassing said route, wherein the satellite or aerial images have been combined, or aggregated, or both.

6. The method as claimed in claim 1, wherein said threshold for the probability of hitting the target for each portion of the route is readjusted to a minimum while keeping each total distance of each path, intended for each addressing unit, below an autonomy capability of the at least one addressing unit.

7. The method as claimed in claim 6, wherein a plurality of paths are calculated for a plurality of addressing units, said threshold for the probability of hitting the target for each portion of the route being readjusted so that a sum of the total distances traveled along the paths is less than a sum of autonomies of the plurality of addressing units.

8. The method as claimed in claim 1, wherein before executing the at least one firing modeling for each weapon and each potential threat shelter, in a preceding step, a compatibility of each weapon as a function of a topology of the potential threat shelter is verified.

9. The method as claimed in claim 1, wherein the at least one firing modeling of each weapon takes climatic data into account.

10. The method as claimed in claim 1, wherein the selection of the at least one weapon is carried out from a database which, for each weapon, stores the at least one firing modeling and a probability of a presence of the weapon as a function of a stored geographical location that corresponds to the geographical area encompassing said route, each weapon being selectable automatically as a function of their presence probability.

11. The method as claimed in claim 1, wherein before executing the at least one firing modeling for each weapon and each potential threat shelter, the positions of potential threat shelters are added to the map by using reports of operators on the terrain.

12. A non-transitory computer-readable medium comprising instructions which lead to the method as claimed in claim 1 being carried out by a processor when said instructions are executed by the processor.

13. A non-transitory computer-readable medium that stores a computer program comprising instructions which lead to the method as claimed in claim 1 being carried out by a processor when said instructions are read and executed by the processor.

14. A server in communication with a command center for securing a geographical area encompassing a route, wherein the server comprises electronic circuitry configured to:

obtain a map of the geographical area encompassing said route;

obtain or select at least one weapon, each weapon being associated with a firing modeling consisting of a probability model of hitting a target when shooting, as a function of a firing distance;

determine positions of potential shelters of threats on the map by using a trained artificial intelligence device;

execute the firing modeling for each selected weapon and each potential threat shelter while relating shots to the route, and storing and summing all probabilities of each weapon hitting the target on each portion of the route;

identify the potential shelters most likely to constitute attack threats along the route by determining the portions of the route that have a probability of hitting the target higher than a determined threshold and by selecting the potential shelters contributing most thereto; and define and provide to the command center at least one path intended for at least one addressing unit, said at least one path being determined in order to neutralize said potential shelters most likely to constitute attack threats;

wherein the command center comprises electronic circuitry configured to:

secure the geographical area encompassing the route by instructing the at least one addressing unit to follow the at least one path, wherein the at least one addressing unit follows the at least one path.

* * * * *